US007615884B2

(12) United States Patent
McMaster

(10) Patent No.: US 7,615,884 B2

(45) Date of Patent: Nov. 10, 2009

(54) HYBRID WIND TURBINE SYSTEM, APPARATUS AND METHOD

(75) Inventor: Thomas McMaster, Bellingham, WA (US)

(73) Assignee: McMasterCorp, Inc., Bellingham, WA (US)

( * ) Notice: Subject to any disclaimer, the term of this patent is extended or adjusted under 35 U.S.C. 154(b) by 0 days.

(21) Appl. No.: 12/022,958

(22) Filed: Jan. 30, 2008

(65) Prior Publication Data

US 2008/0258473 A1 Oct. 23, 2008

Related U.S. Application Data

(60) Provisional application No. 60/898,619, filed on Jan. 30, 2007.

(51) Int. Cl.
*H02P 9/04* (2006.01)

(52) U.S. Cl. ............................ 290/55; 60/618; 60/398; 60/641.8; 415/908; 290/44

(58) Field of Classification Search .................. 60/698, 60/716; 290/44, 55
See application file for complete search history.

(56) References Cited

U.S. PATENT DOCUMENTS 612,739 A 10/1898 Lambert
3,830,062 A * 8/1974 Morgan et al. ................ 60/618
4,186,312 A * 1/1980 Dvorak ....................... 290/4 R
4,204,126 A 5/1980 Diggs
4,476,853 A * 10/1984 Arbogast .................... 126/578
5,740,677 A 4/1998 Vesteen
6,127,739 A 10/2000 Appa
6,278,197 B1 8/2001 Appa
6,492,743 B1 12/2002 Appa
7,067,937 B2 6/2006 Enish et al.
7,436,083 B2 * 10/2008 Shibata et al. ................ 290/44
2005/0225091 A1 10/2005 Enish et al.

* cited by examiner

*Primary Examiner*—Thomas E Denion
*Assistant Examiner*—Christopher Jetton
(74) *Attorney, Agent, or Firm*—Michael F. Hughes; Hughes Law Firm, PLLC

(57) ABSTRACT

A hybrid wind turbine assembly and method capable of providing a total firm power output. There is a wind power section which delivers non-firm power from the wind turbine to a generator section. Then there is also an auxiliary power section which is capable of providing firm power to the same generator section. This can operate in three operating modes, namely an only wind power mode, an only auxiliary power mode, and a combined wind power and auxiliary power mode.

24 Claims, 10 Drawing Sheets

114
112
110
22d
20d
69d
68d
116
118
11
24d
13d
18d
28d
118
108
104
11d
106
100
94
102
98
90
92
96

20e
24e
22e
25e
18e
13e
138
136
132
134
11e
130

HYBRID WIND TURBINE SYSTEM, APPARATUS AND METHOD

RELATED APPLICATIONS

This application claims priority benefit of U.S. Ser. No. 60/898,619, filed Jan. 30, 2007.

BACKGROUND OF THE DISCLOSURE a) Field of the Disclosure

The present disclosure relates in general to wind turbine technology, and more particularly to a system combining the apparatus and method of the wind turbine with other energy sources, b) Background Information While wind turbine power has many advantages as an additional and/or alternative source of energy, it does have the drawback that there are time intervals where it is not able to produce any power at all, or only a small amount of power. Thus, there have been various approaches to combine the wind power source with other independent power sources to be able to produce power more reliably, in the form of "firm power".

A search of the patent literature has disclosed patents related to solving these problems, and these are summarized in the following text.

U.S. Pat. No. 4,204,126 (Diggs) discloses a "Guided Flow Wind Power Machine With Tubular Fans", which, when powered by the wind, can generate electricity. Also, when there is enough wind power it has the capability of also lifting "massive weights" hydraulically. Then when the wind has subsided, the weights can be permitted to be drop downwardly to supply energy to drive a generator. FIGS. 4 and 5 show the weights 114 through 120 arranged in quadrants.

U.S. Pat. No. 5,740,677 (Vestesen) shows a system which is adapted for use at a location where there is a need for electricity and also fresh water. However, this residential community is also near a source of salt water. There is a wind diesel plant which supplies electricity for various uses and also operates a distillation unit to supply the fresh water. The wind/diesel plant comprises at least an internal combustion engine, a wind turbine, a distillation unit, a first closed fluid circuit containing heating and cooling devices, and a second open fluids circuit.

U.S. Pat. No. 6,127,739 (Appa) issued Oct. 3, 2000, and is the first of three patents which have the same inventor. In this patent, there is a forward front rotor 12 having blades that would cause rotation in one direction, then there is a rear rotor 21 (called a "leeward rotor 21") positioned behind the front rotor 12 and rotating in the opposite direction. This patent states that the various items added to this apparatus would produce a substantially higher "value of energy efficiency factor".

U.S. Pat. No. 6,278,197 (Appa) is the second patent to the inventor and it discloses a wind turbine where there is a forward set of turbine blades which rotate in one direction, and a second set of turbine blades which are in the wake of the first set and which rotate in the opposite direction. The reason given for this is that there is still energy in the air that passes through the first set of turbine blades, and this is utilized in the second set of turbine blades.

U.S. Pat. No. 6,492,743 B1 (Appa) is the third (and more recent) patent to Mr. Appa, and this also shows a basic configuration of wind turbine where there are forward and rear set of blades. There is a heat exchanger having a centrifugal fan to circulate ambient air to cool an alternator in the apparatus, and the hot air is directed to a combustion chamber by means of an air duct in the blades. Natural gas or liquid is also conveyed to the rotating frame. When wind speed is low, fuel will be injected into the combustion chamber and burned with a large mass of air. The hot gasses expand in an exit nozzle to provide thrust to assist wind power.

SUMMARY OF THE EMBODIMENTS

The embodiments of the invention comprise a wind turbine assembly and method capable of providing a total firm power output. There is a wind power section which delivers non-firm power from the wind turbine to a generator section. Then there is also an auxiliary power section which is capable of providing firm power to the same generator section. This can operate in three operating modes, namely an only wind power mode, an only auxiliary power mode, and a combined wind power and auxiliary power mode.

DESCRIPTION OF THE EMBODIMENTS OF THE PRESENT INVENTION

Figure 1:
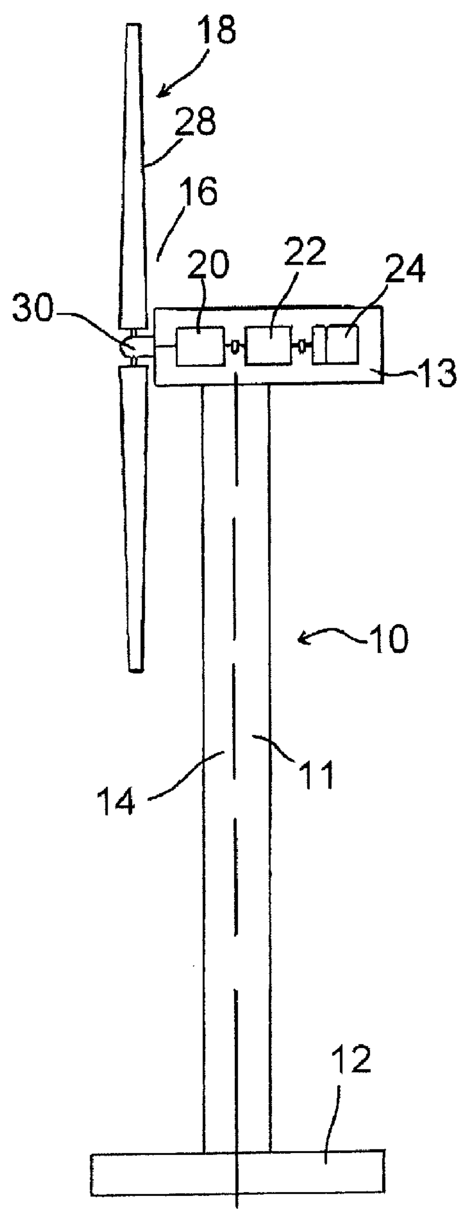
FIG. 1 is an elevation view of a hybrid wind turbine system of a first embodiment of the present invention.

It is believed that a clearer understanding of the present invention can be obtained by first reviewing briefly the overall system of a first embodiment of the present invention, as shown in FIG. 1. This is followed by a more detailed description of a group of components shown in FIG. 2, which are typically found in a prior art wind turbine apparatus, and some or all of which can be incorporated in the embodiments of the present invention. This will then be followed by a more detailed description of the embodiments of the present invention.

A. A General Description of the First Embodiment

To proceed now with the more general description of the first embodiment, as indicated above, this will be done with reference to FIG. 1. There is a wind turbine assembly 10 which comprises a base support section comprising a vertically aligned tower 11 which is supported by a base 12. At the upper end of the tower 11, there is a power generating main support structure 13 which is rotatably mounted to the tower 11 to rotate about a vertical axis of rotation 14 centrally located in the tower 11. This support section 13 provides a support for a power generating section 16 of the first embodiment, and it may be in the configuration of a nacelle 13 commonly used with wind turbines.

The entire power generating section 16 comprises a blade section 18, a rotary speed changing drive section 20, a generator section 22, and an auxiliary power section 24. The blade section 18 comprises a plurality of turbine blades 28, and a hub or rotor 30 to which the blades 18 are connected.

The blade section 18 and the speed changing drive section 20 can be grouped as the primary power generating portion while the auxiliary power section 24 (as well as the auxiliary power or back up power components, including those that are shown in other embodiments) can be considered as being in a secondary power generating portion.

The primary and secondary power generating portions together function in a manner to enable the generator 22 to provide firm power.

B. Summary of Some Prior Art Components

Figure 2:
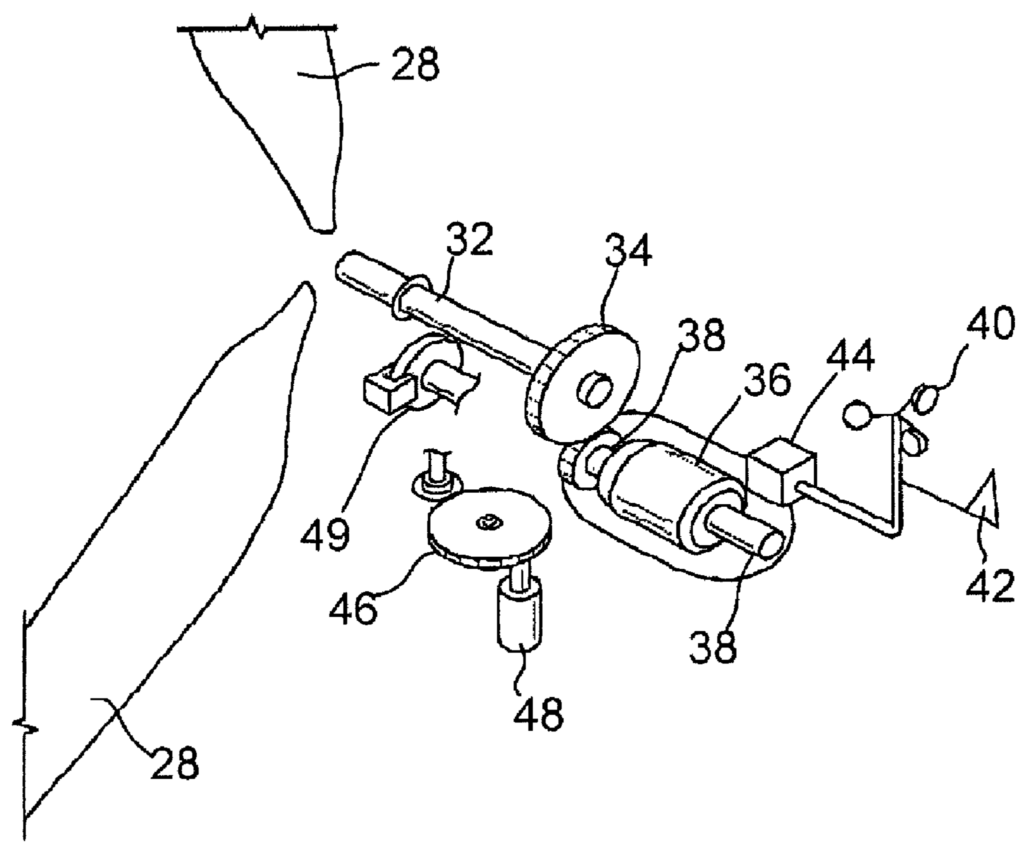
FIG. 2 is an isometric exploded view showing the components of a typical wind turbine apparatus, some or all of which can be combined with the wind turbine apparatus of the embodiments of the present invention.

With the overall description of this first embodiment being presented, attention is now directed to FIG. 2, which, as indicated above, is an exploded drawing of a number of components which in themselves exist in the prior art and are commonly used in present day wind turbines. In FIG. 2 only two of the three blades 28 are shown and the hub 30 is not shown. There is a low speed shaft 32, which (as shown in FIG. 2) connects to a speed changing drive section 34 which is shown somewhat schematically, and (as its name implies) provided a power output at a higher RPM than that of the shaft 32.

This drive section 34 is commonly in the form of a gear section. In general, the rotational speed of the low speed shaft 32 would be between about 30 to 60 rotations per minute, and the gear section 34 is in turn connected to the generator 22 to cause it to rotate at a speed between about 1,200 to 3,600 RPM. This would typically be a rotational speed required by a large number of present day generators to produce electricity. The gear section 34 connects to a shaft 38 which is located in the generator 36 (see FIG. 2).

There is provided an anemometer 40 which measures the wind speed, and also a wind vane 42 to ascertain wind direction. Both the wind speed and the wind direction data are transmitted to a controller 44. The controller 44, as its name implies, performs various control functions. For example, it controls a yaw drive 46 and its associated motor 48 to keep the blades 28 facing into the wind as the wind direction changes, starts and stops the wind turbine, etc. There is also provided a disc brake 49 for the low speed shaft 32, and in the prior art this can be applied mechanically, electrically, or hydraulically to stop the rotation of the rotary components in emergencies.

All, or most all, of the components which are shown in FIG. 2 are, or may be, present in the embodiments of the present invention. However, for convenience of illustration (e.g., to avoid cluttering up the drawings), these are not shown in the following drawings (FIGS. 3-11) which illustrate the nine embodiments of the present invention.

C. Description of the First Embodiment of the Present Invention

Figure 3:
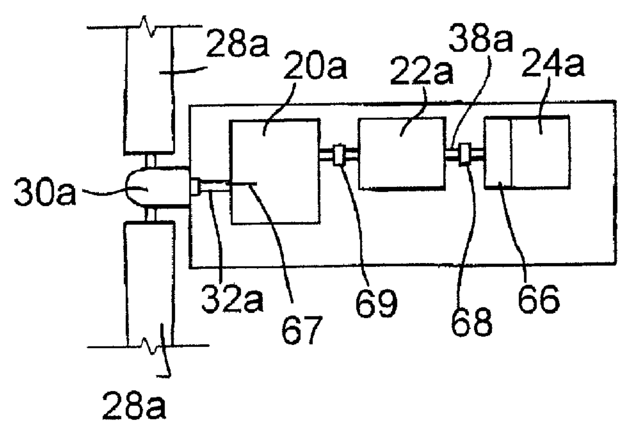
FIG. 3 is a somewhat schematic view of a power generating section 16 of the first embodiment.

All (or many) of the components of this first embodiment are shown in at least one of FIGS. 1, 2 and 3. Reference is now made to FIG. 3. It will be noted that a number of the components which appear in FIG. 3 also appear in either FIG. 1 or 2. For clarification, those components in FIG. 3 which already appear in either or both of FIGS. 1 and 2, are given like numerical designations, with an "a" suffix distinguishing those particular components. Then the components which appear in FIG. 3 and which do not appear in either FIG. 1 or 2 will be given new numerical designations.

To proceed now with a description of the first embodiment of FIG. 3, as in FIG. 1, there are the blades 28*a* which are attached to the hub 30*a*. The hub 30*a* in turn connects to and drives the low speed shaft 32*a*. The low speed shaft 32*a* in turn drives the speed changing drive section 20*a* which then provides a high rotational speed power output to the generator 22*a*.

The components of this first embodiment described in the paragraph immediately above, are already found in FIG. 1 or 2. In FIG. 3 there is also shown an auxiliary drive section 24*a* capable of providing a drive output to the generator 22*a*.

For convenience of description, in describing the location of the components in FIG. 3, the hub 30*a* shall be considered to be a front or forward location, and the location of the auxiliary drive unit 24*a* shall be considered as having a rear location. Also, the axis of rotation of the hub 30*a*, the blades 28*a*, and also of the low speed shaft 32*a*, and any other components which rotate on the same axis, shall be designated the "power generating axis of rotation 67".

To return now to the description of this first embodiment, the auxiliary drive unit 24*a* provides a rotating drive output to a torque converter 66. The torque converter 66 in turn has a drive connection to an overrunning drive member 68 (which can be simply an overrunning drive clutch) that in turn connects to the rear end of the high speed shaft 38*a* of the generator 22*a*. Then the forward end of the shaft 38*a* of the generator 22*a* connects to a forward overrunning drive member 69 that connects to the drive output of the speed changing drive section 20*a*. The torque converter 66 located between the auxiliary drive unit 24*a* and the generator 22*a* may or may not be required and depends on the design speed of the generator 22*a* and the auxiliary drive unit 24*a*. If the operating speed of the auxiliary drive unit 24*a* is a close match to the generator 22*a* operating speed, the overrunning clutch 68 would provide an adequate method of coupling the generator 22*a* to the auxiliary drive unit 24*a*.

There are many types of conventional drives that could function as the auxiliary drive unit 24*a*. For example, this could include an internal combustion engine, external combustion engine, steam turbine, steam engine, or hybrid drive. The most common types of drives would include, but not be limited to, gasoline engines, diesel engines, natural gas engines, gas turbine engines, steam turbines, steam engines, sterling engines, gas expanders, or hydraulic or electric motors with a nearby source of power or hydraulic energy. Sources of energy for the auxiliary drive unit 24*a* could include gasoline, diesel, jet fuel, heavy oil, natural gas, propane, hydrogen, ethanol, coal, wood, or any other energy source suitable for the auxiliary drive or its cooperating equipment.

D. Operation of the First Embodiment

To describe now the operating features of this first embodiment, let us review three different situations, namely:

i. the wind is at a sufficient velocity so that it is able to generate sufficient power to produce the desired power output of the generator 22*a;* ii. the wind velocity is not sufficient to drive the blade section at all, and the auxiliary drive section 24*a* is activated to generate the needed electric power; and iii. the wind velocity is such that it is able to rotate the blade section 18*a* to generate only an electrical power output which is below the desired output of the generator 22*a*, and to obtain the desired level of the total electrical power output, it is necessary to operate the auxiliary drive section 24*a*.

In the first situation (where there the wind power is at a sufficiently high level), the blade section 18*a* is rotated to drive the blades sections 18*a* at full power output or near full power output. More specifically, the blade section 18*a* is rotating with sufficient power output so that the speed augmenting drive section 20*a* is acting through an overrunning clutch 69 to drive the generator 22*a* at a sufficient power output so that sufficient electrical power is developed. The overrunning drive section 68, which connects to the shaft 38*a* of the generator 22*a*, simply overruns its connection to the auxiliary drive section 24*a*, thus, the auxiliary drive section 24*a* remains stationary.

Let us now take the second situation where there is either no wind or such a small velocity of the wind that the blade section 18*a* is put in a position where it is stationary or simply not rotating. In this situation, the auxiliary drive section 24*a* is activated manually or automatically so that its rotational output is directed through the torque converter 66, which in turn acts through the overrunning drive 68, which is caused to rotate in a direction so that it drives the generator 22*a*.

At the same time, the speed changing drive section 20*a* remains stationary, and since the connection between the drive section 20*a* and the generator 22*a* is the overrunning drive member 69, the generator 22*a* is able to operate to rotate in a manner so that it has no drive connection with the drive section 20*a* and is driven totally by the auxiliary power unit 24*a*.

Let us now consider the third situation, which is that the wind generated power is great enough to achieve a useful lower power output level, but is not great enough to meet the desired power output. In this instance, the auxiliary drive section 24*a* would be utilized to cause rotation of its torque converter 66 to act through its drive member 68 and provide power to the rear end of the shaft 38*a* of the generator 22*a*.

At the same time, the pitch of the blades 28*a* could be set at an angle of attack to optimize the power output that is developed by the use of both power sources. The effect of this is that the shaft 38*a* of the generator 22*a* would be driven at both its front and rear end portions, so that there would be sufficient power to generate the desired electrical power output.

Also, in this third operating mode, the two overrunning drive members (drive clutches) 68 and 69 are operating in their engaged position, so that these are providing rotational forces to the generator 22*a* at a sufficiently high power output.

E. Applications of the First Embodiment

Let us now turn our attention to some of the possible applications of the system of the first embodiment of the invention (i.e., the various ways it might be used). As indicated earlier in this text, one of the drawbacks of a wind turbine is that it produces power intermittently. Thus, this puts wind power in the category of "non-firm energy producers". However, by combining the wind power turbine in the combination of this first embodiment, this now becomes a source of firm power that could supply energy to a power grid on a continuous basis.

Another situation of possible use is where there is a municipality which needs a reliable source of electricity. With the system of the first embodiment, the system could be engineered so that the auxiliary power source by itself could generate an adequate level of electric power. In that situation, the auxiliary power source would be able to operate as the sole power source in that time interval when the wind turbine power source would be idle. Then as the wind energy was available, the system could be operated in the mode mentioned above as Mode 1 or Mode 2 where the electric power output would be entirely from the wind turbine or as Mode 3, a dual drive mode, where the combined operation of both the wind turbine and the auxiliary power section are utilized to drive the generator 22*a*.

From the above comments, it becomes apparent that only the one generator 22*a* would be needed in each of the three modes. There are various expenses incurred in providing electric power through a generator, such as the cost of switchgear, transformers, etc. With this arrangement of this embodiment, that extra expense is alleviated by utilizing the same generator for:

i) the "only wind power mode";

ii) the "sole auxiliary power mode"; and iii) the "combined wind power/auxiliary power mode".

It is to be understood that all of the components (or a large number of the components) that are shown in FIG. 2 could be utilized also in each of the several embodiments of the present invention.

i) Generator Types

To comment generally on the generator 22*a*, wind turbines are supplied with several different types of generators, including induction generators, double fed induction generators (for speed control), variable slip induction generators (for limited changes in speed), synchronous generators (directly and indirectly connected), and DC generators (typically small wind turbines). Most wind turbines in service are standard induction generators which are constant speed machines. Variable speed generators, with the exception of DC generators, can be held at a fairly constant speed with the control system. This is a plus for the operation of the auxiliary drive in that the additional energy input to the generator does not change the generator speed appreciably. Additional torque input to the generator simply causes more power output from the generator. The DC generator is not considered an ideal candidate for the auxiliary drive as too much torque from the auxiliary drive could speed up the wind turbine to the point where the wind would not contribute to energy production.

ii) Auxiliary Drive Considerations

To comment generally about the different possibilities of the auxiliary drive 24*a*, it could be coupled directly to the generator via a torque converter or overrunning clutch or it can be connected through a gearbox, again using a torque converter or overrunning clutch. In most cases, an overrunning clutch will be sufficient; however, if there is a need to run the engine at constant speed and vary the output shaft speed to the generator, a torque converter can be used. If the wind turbine is at rest (zero speed) and the operator wishes to run the generator, he can start the auxiliary drive 24*a*. Because the generator is at rest, the overrunning clutch will engage the generator as soon as the auxiliary drive commences startup. The generator rotor will rotate along with the auxiliary drive shaft during startup and will continue to rotate at the same speed as the auxiliary drive at all times.

To connect the generator to the grid, the auxiliary drive must speed the generator rotor up to a speed that matches the generator rotating magnetic field. At that point the generator breaker can be closed to connect the generator to the grid. Any additional power input from the auxiliary drive to the generator will cause power to flow out of the generator to the grid. An alternate method of starting up the generator would be to use the soft start feature supplied with most large scale wind turbines to connect them to the grid. In this case the wind must be used to rotate the propeller, gear, and generator to get it close to the normal operating speed before closing the breaker. In some cases the soft start feature can be used to start the generator from dead stop. In this case, the generator acts as a motor until it gets up to speed at which time the wind energy input causes power to flow out from the generator.

If the auxiliary drive had a torque converter, the operator could start the auxiliary drive and run it up to operating speed before engaging the torque converter to spin up the generator. With the torque converter the engine speed could be changed and the output shaft speed from the torque converter could be held at a constant speed or, conversely, the engine speed could be kept constant and the output speed could be varied along with the generator speed.

The generator can be driven from the wind turbine end, the auxiliary drive end, or both ends at the same time. The generator will not know the difference. It only knows that torque is being applied to its rotor to generate electricity. It would be possible to use the auxiliary drive to reduce the impact of wind gusts on the wind turbine. This could be done by applying a certain amount of power from the auxiliary drive which is over and above the power being supplied to the generator from the wind. In this case the wind turbine would not be supplying full rated power to the generator. When a wind gust hits the wind turbine and increases the generator output and causes high loads on the gearbox, the auxiliary drive would receive a governor signal to reduce its power output so the generator and gear do not experience damaging load increases. Wind turbine manufacturers are constantly working on improvements to minimize the damaging effects of wind gusts and would welcome new solutions to the problem. The current methods to control the effect of wind gusts are associated with the electrical control systems and generators. Variable slip generators are used to help solve the wind gust problem by allowing the generator to temporarily speed up (increased generator slip) to allow the additional wind energy to be converted into kinetic energy and not forcing the energy through the generator. It would be like installing a clutch between the wind turbine propeller shaft and gearbox to allow the clutch to slip during wind gusts to avoid damage to the gears.

iii) Structural Considerations

An additional benefit of the auxiliary drive arrangement is to change the center of gravity of the nacelle. The auxiliary drive acts as a counterweight on the opposite end of the nacelle as the propeller, hub, shaft and gearbox. Due to the extreme weight of those components, the wind turbine nacelle must be positioned to keep its center of gravity above the center of the tower. This means the propeller is positioned quite close to the tower which causes the propeller blades to bend every time they pass by the wind turbine support tower. The wind shadow and flexing of propeller blades has caused fatigue failures of blades in the past. The weight of the auxiliary drive on the opposite end of the nacelle would allow the nacelle to be repositioned so that the propeller blades are farther away from the tower and less susceptible to flexing and fatigue failures.

F. The Second Embodiment of the Invention

Figure 4:
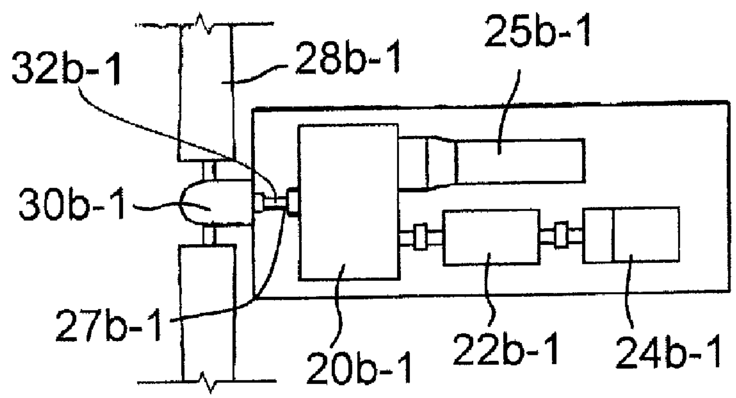
FIGS. 4, 4A and 4B are views similar to FIG. 3 showing a second embodiment illustrating alternate locations for the auxiliary drives.
Figure 4A:
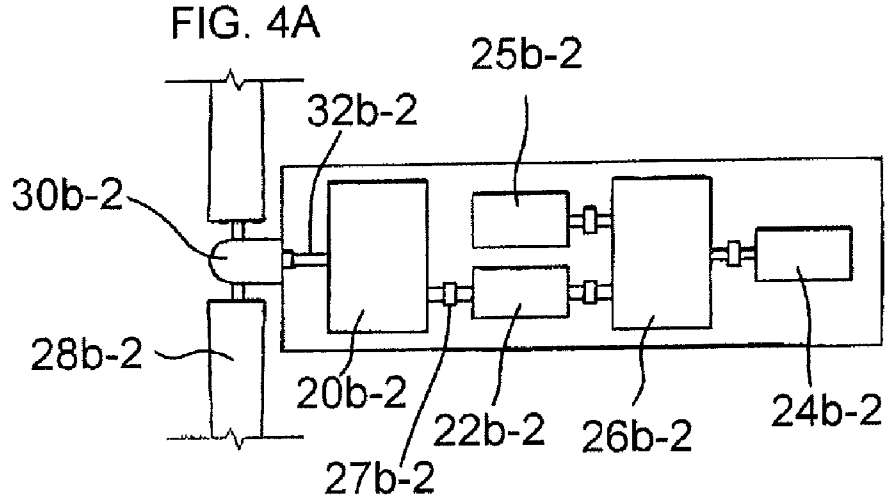
Figure 4B:
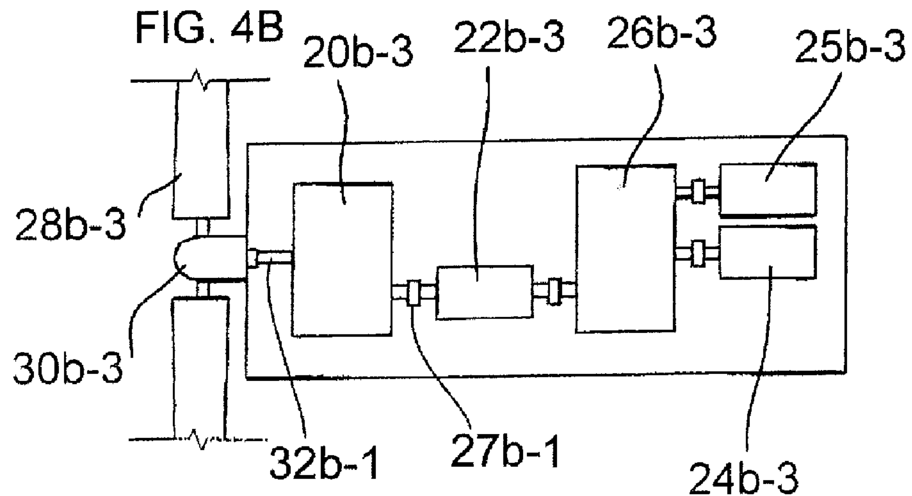

Reference will now be made to FIGS. 4, 4A and 4B which are different configurations of this second embodiment.

The second embodiment is similar to the first embodiment except that some of the auxiliary drive components are placed in different relative positions, and an auxiliary drive speed changing section is added in FIGS. 4A and 4B to allow the installation of two auxiliary drives. An example of the foregoing would be the installation of a natural gas engine as an auxiliary drive and a steam turbine as the second auxiliary drive. The second auxiliary drive would be part of an energy recovery system that would recover waste heat from the first auxiliary drive and convert the waste heat into steam. The steam would then be used as an energy input to the second auxiliary drive. Another example of a use for a second auxiliary drive would be a solar/wind hybrid wind turbine shown in FIG. 7 where steam generated in the solar collector is routed to the second auxiliary drive (steam turbine) to provide additional power to the generator.

Components of this second embodiment which are the same as, or similar to, components shown in FIGS. 1, 2 and 3, will be given like designations with a "b" suffix distinguishing those of the second embodiment, and the newly mentioned components are given new numerical designations. Further, to distinguish between the three different versions, in the version of FIG. 4, a suffix of "b-1" will distinguish those of the version of FIG. 4, a suffix of "b-2" will distinguish those of the second version of 4A, and the suffix of "b-3" will distinguish those of the third version of FIG. 48.

All three of these versions of the second embodiment have the following components, the blades 28*b*, the hub 30*b*, the low speed shaft 32*b*, the speed changing section 20*b*, the generator section 22*b*, and the auxiliary drive section 24*b*. In FIG. 4, all of these components are arranged in substantially the same way as corresponding components in FIG. 3, except that there are two auxiliary drive sections 24*b*-1 and 25*b*-1. Other specific features are the same, such as having the torque converter and overrunning clutches located in substantially the same manner as in the first embodiment of FIG. 3.

The first version of the second embodiment of FIG. 4 differs from the first embodiment in that in addition to the auxiliary drive 24*b*-1 there is a second auxiliary drive 25*b*-1 which connects to the speed changing drive section 20*b*-1. Power from the auxiliary drive 25*b*-1 is transmitted through the speed changing drive section 20*b*-1 to the generator 22*b*-1 for additional power output. In FIG. 4 an overrunning clutch 27*b*-1 must be installed to de-couple the wind turbine shaft 32*b*-1 from the speed changing drive 20*b*-1 when there is insufficient wind to rotate wind turbine shaft 32*b*-1.

In FIG. 4A the second version of FIG. 4, we have the same components of the wind turbine blades 28*b*-2, the hub 30*b*-2, the low speed shaft 32*b*-2, the speed changing section 20*b*-2, the generator section 22*b*-2, and the auxiliary power section 24*b*-2. FIG. 4A differs from FIG. 4 in that there is provided a second speed changing section 26*b*-2 which has an operative connection to the auxiliary drive section 24*b*-2. Then there is a second auxiliary drive section 25*b*-2 which also has an operative connection through the second speed changing section 26*b*-2. The second auxiliary drive section 25*b*-2 provides additional power to generator 22*b*-2 as available from energy recovery systems or energy generation systems other than wind, which are part of the hybrid wind turbine system.

FIG. 4B has substantially the same components as in FIG. 4A, except that in addition to the auxiliary drive section 24*b*-3 transmitting power through the second speed changing section 26*b*-3, the second auxiliary drive section 25*b*-3 is located on the same side of the second speed changing section 26*b*-3. In other respects, it functions the same way as the second version of FIG. 4A.

G. A Third Embodiment of the Invention

Figure 5:
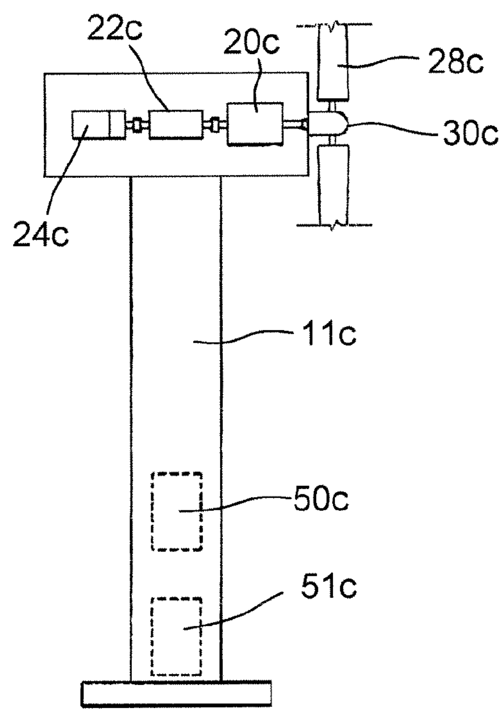
FIGS. 5 and 5A are views similar to FIGS. 1 and 3, showing a third embodiment which shows a heat recovery section in the support tower.

A third embodiment of the present invention will now be described with reference to FIGS. 5 and 5A. Components of this third embodiment which are the same as, or similar to, components of the earlier embodiments will be given like numerical designations, with a "c" suffix distinguishing those of the third embodiment.

In this third embodiment, the basic system as shown in FIG. 3 is used, so that the main components and their functions of this third embodiment are substantially the same as in the third embodiment as they are in the first embodiment. However, the added feature is that the auxiliary engine drive is combined with two stages of an organic rankine cycle heat recovery system to increase the overall efficiency of the engine drive.

In this embodiment the two stages of heat recovery 50*c* and 51*c* are located in the wind turbine support tower 11*c*.

With this system, the heat recovery process captures waste heat from the auxiliary engine 24*c* exhaust and the auxiliary engine 24*c* coolant. Also, the waste heat is converted into useful electricity using a separate turbine and generator which is part of the heat recovery system located in the tower 11*c*.

Figure 5A:
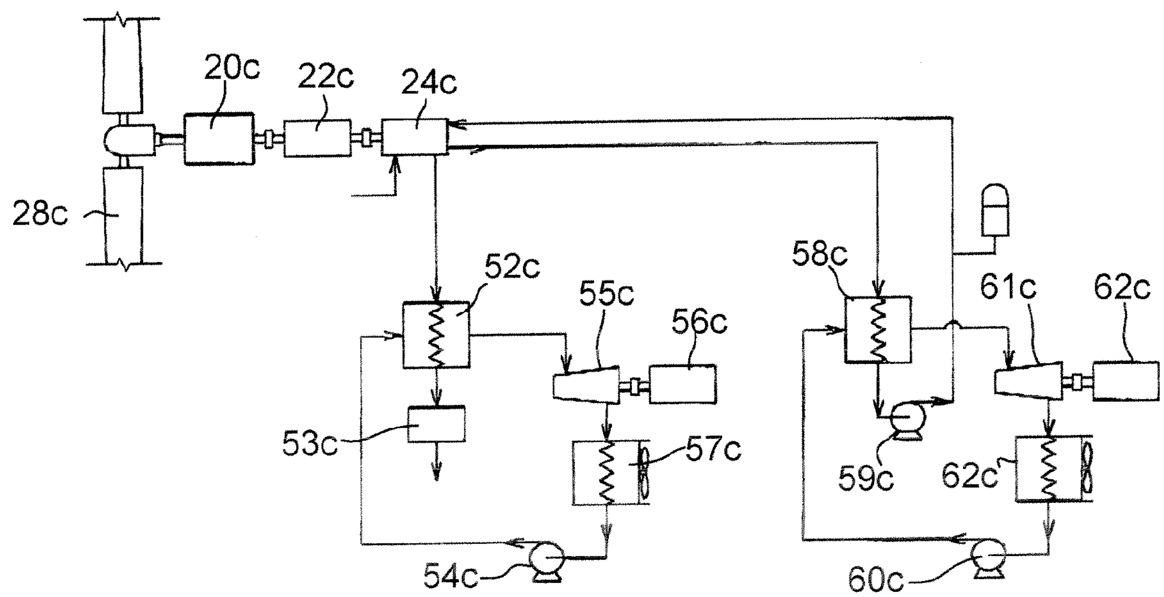

In FIG. 5A the hot exhaust from auxiliary drive engine 24*c* flows to an organic rankine cycle boiler 52*c* to vaporize the organic working fluid. The cooled exhaust then flows to an emission control unit 53*c* before being discharged to atmosphere. The rankine cycle involves a boiler feed pump 54*c* which pumps the organic working fluid to the boiler 52*c* for vaporization. The vapor then flows to the expansion turbine 55*c* which is coupled to a generator 56*c*. Power from the generator 56*c* is connected to the wind turbine electrical switchgear. The vapor then flows out of the expansion turbine to the air cooled condenser 57*c* where it is condensed back into a liquid. The liquid working fluid then flows back to the boiler feed pump 54*c* for recirculation.

In this embodiment the auxiliary drive engine coolant is routed from auxiliary drive engine 24*c* to an organic rankine cycle boiler 58*c* to vaporize the organic working fluid. The cooled engine coolant is then pumped back to engine 24*c* using coolant circulation pump 59*c*. The rankine cycle involves a boiler feed pump 60*c* which pumps the organic working fluid to the boiler 58*c* for vaporization. The vapor then flows to the expansion turbine 61*c* which is coupled to a generator 62*c*. Power from the generator 62*c* is connected to the wind turbine electrical switchgear. The vapor then flows out of the expansion turbine 61*c* to the air cooled condenser 62*c* where it is condensed back into a liquid. The liquid working fluid then flows back to the boiler feed pump 60*c* for recirculation.

With the conversion of waste energy into additional electricity, the auxiliary drive 24*c* is a very efficient source of additional power for the hybrid wind turbine.

H. A Fourth Embodiment of the Invention

Figure 6:
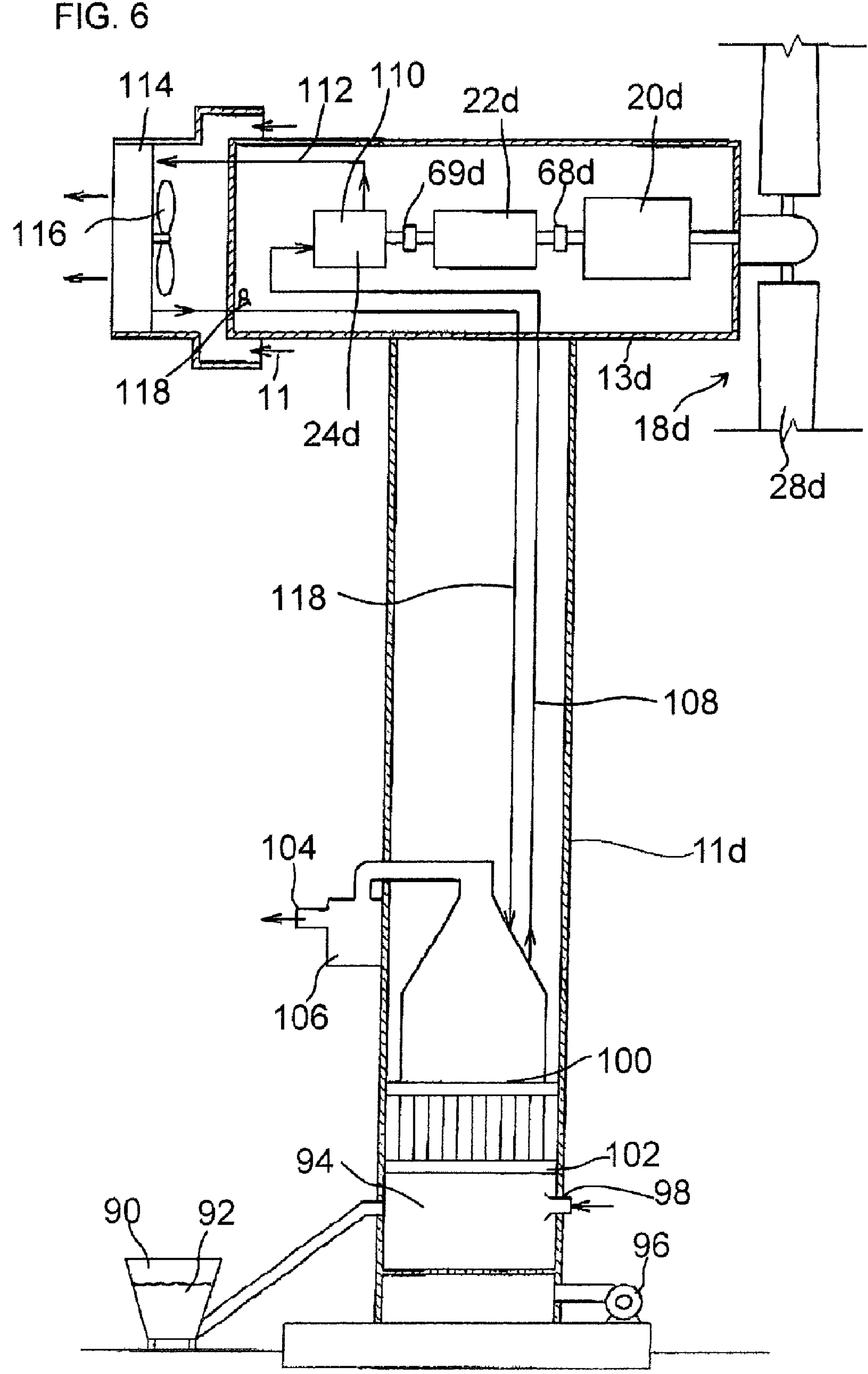
FIG. 6 shows yet a fourth embodiment of the invention, where a steam generator and steam turbine are utilized as the auxiliary power source.

FIG. 6 shows a fourth embodiment of the present invention. Components of this fourth embodiment which are the same as, or similar to, components of the earlier embodiment will be given like numerical designations, with a "d" suffix distinguishing those of the fourth embodiment. This fourth embodiment has the same basic operating components as shown in the first embodiment, except that in this fourth embodiment, the auxiliary drive section 24*d* is steam powered. Further, the steam that is generated to supply the power is generated by a boiler that is located in the support tower 11*d*. The fuel can be solid fuel, liquid fuel, gaseous fuel, or other fuels.

As shown in FIG. 6, there is the support structure 13*d* mounted to the tower 11*d*, the blade section 18*d*, a speed changing drive section 20*d*, and a generator 22*d*. There are also the two overrunning drive members 68*d* and 69*d* on opposite sides of the generator 22*d*.

There is a solids fuel hopper 90, which directs the solid fuel 92 into a furnace area 94, where there is a forced draft generated by the fan 96. Further, there is a liquid and/or natural gas burner 98, a steam drum 100, a mud drum 102, a boiler flue gas discharge 104, and a bag house 106. There is a steam conduit 108 leading to a steam drive turbine 110. The steam drive turbine 110 is positioned to supply power to the generator 22*d*. The steam exhaust from the steam turbine 110 flows along a conduit 112 to an air cooled surface condenser 114 and is cooled by a fan 116. The condensate then flows to the feed water pump 105 (not shown in FIG. 6) and back to the boiler steam drum 100.

I. The Fifth Embodiment of the Invention

A fifth embodiment of the present invention will now be described with reference to FIG. 7. Components of this fifth embodiment which are the same as, or similar to, components of any of the earlier embodiments will be given like numerical designations, with an "e" suffix distinguishing those of this fifth embodiment.

In this fifth embodiment, there is a solar thermal power source in addition to the wind turbine power and also the auxiliary power section. In this case, there would be three sources of power to drive the generator, namely:

i) wind;

ii) solar generated power; and iii) the auxiliary drive section which, as indicated previously in this text, could be fueled by a wide variety of energy sources, such as an engine driven by diesel fuel, natural gas, ethanol, etc.

The wind and solar energy inputs would produce non-firm energy that cannot be depended upon as a constant source of power. However, the auxiliary drive 24*e* (engine or turbine) would be the ultimate backup for firm power generation.

Thus, with these three options offered with the wind turbine, the customer could purchase a basic wind turbine, a wind turbine with a solar thermal energy drive, a wind turbine with an engine or turbine (steam, gas turbine, etc.) auxiliary drive, or a wind turbine with both a solar thermal energy drive and an engine or turbine drive. Thus, different sources of energy input to the wind turbine are not mutually exclusive and can cooperate to maximize the output of the wind turbine. With that background information having been given, FIG. 7 shows the basic components that are shown in the first embodiment of FIG. 3, and the components discussed above with reference to FIG. 7.

Figures 7, 7A:
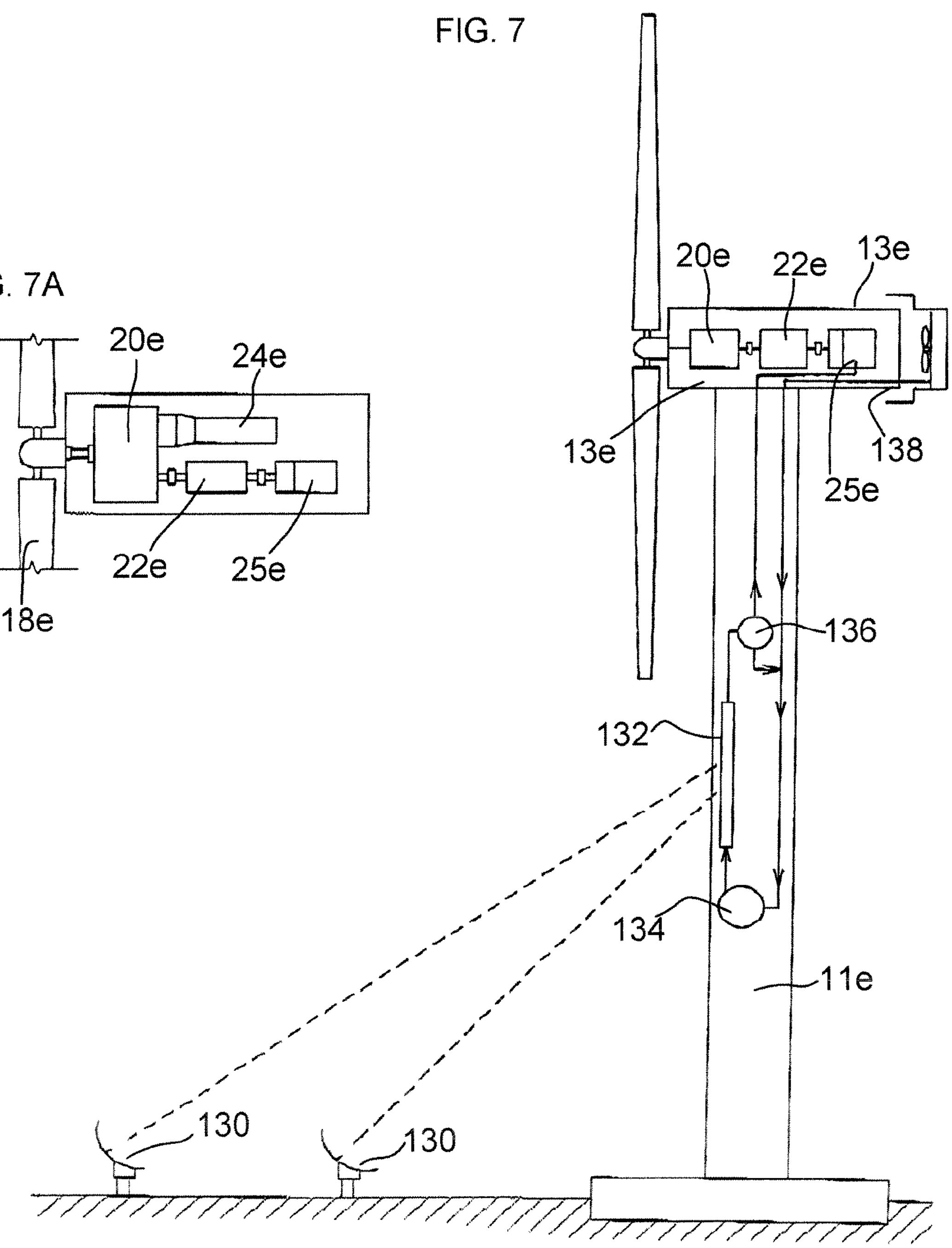
FIGS. 7 and 7A are views that show a basic wind turbine system which also utilizes solar energy to add energy to the system.

Thus, there is the source of firm power in the form of an auxiliary drive engine 24*e* or other power source 25*e* (see FIG. 7A).

In this embodiment, in FIG. 7 there is the tower 1*e* which supports the rotatably mounted support structure 13*e*, the speed changing drive section 20*e*, and the generator 22*e*. FIG. 7A shows the engine auxiliary drive 24*e*-1 and the auxiliary drive 25*e*-1 in the form of a steam turbine.

To provide the solar energy, FIG. 7 shows there is a plurality of heliostats 130 which reflect the sun rays in a converging pattern to a solar absorber 132 that is mounted on the tower 11*e*. FIG. 7 shows there is a boiler feed pump 134 which pumps water or other liquid up through the solar absorber 132 to a steam drum 136 so that the steam can be separated from the steam and water mixture generated in the solar absorber 132. The steam or other gaseous drive medium then travels upwardly to a steam turbine 25*e*. The steam turbine auxiliary drive 25 *e*-1 provides a rotary power output to the generator 22*e* in combination with the engine auxiliary drive power output 24*e*-1 (see FIG. 7A), or through another operative connection to the generator 22*e*.

In operation, either or both of the non firm power sources (i.e., the wind power source and the solar power source) are utilized to provide the energy output to rotate the generator 22*e*. In the event that either or both of the wind power and solar power are absent because of the surrounding weather environment, and are producing no usable power, or only a smaller output of power, then the auxiliary power source 24*e*-1 can be used to supplement the power input to an adequate level. However, if the solar power source and/or the wind power source are adequate, then the auxiliary power section 24*e*-1 will not be required.

J. The Sixth Embodiment of the Invention

Figure 8:
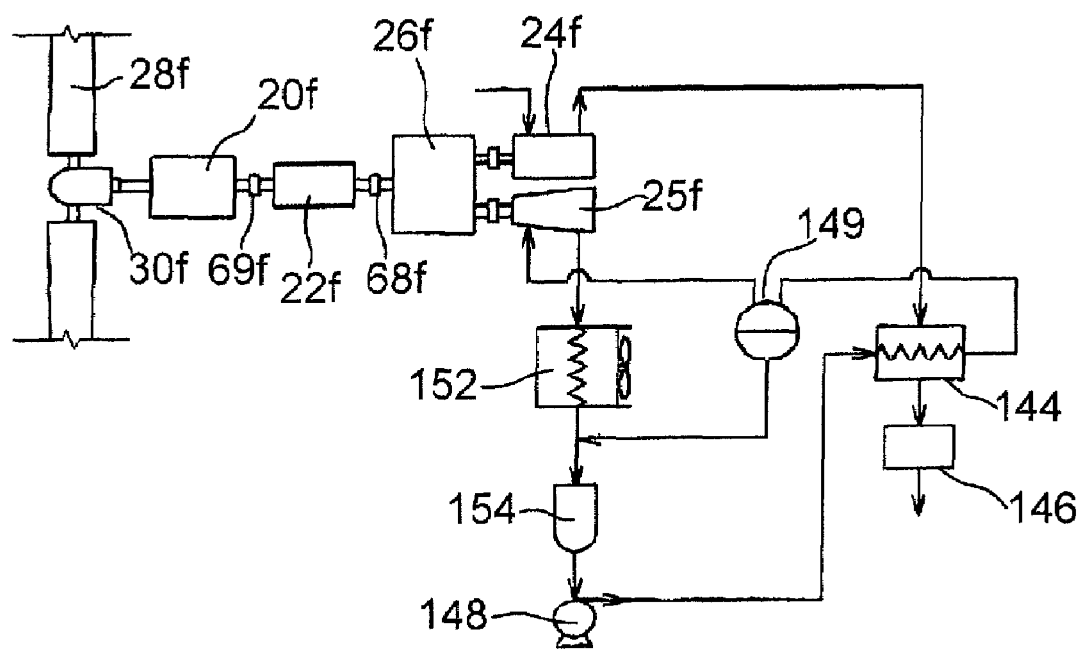
FIG. 8 is similar to FIG. 7 in that it shows a basic wind turbine system which also utilizes an engine auxiliary drive with heat recovery and an associated steam turbine auxiliary drive.

A sixth embodiment of the present invention will now be described with reference to FIG. 8. Components of this sixth embodiment which are the same as, or similar to, components of any of the earlier embodiments will be given like numerical designations with an "f" suffix distinguishing those of this sixth embodiment.

In this sixth embodiment, there is an addition of a steam rankine cycle heat recovery system to recover heat from the engine auxiliary drive exhaust. To describe this sixth embodiment, reference is made to FIG. 8.

Hot engine exhaust leaving the auxiliary drive 24*f* exhaust flows to a heat recovery steam generator 144 where the heat in the exhaust generates steam. The cooled exhaust then flows to the emission control unit 146 for treatment before it is discharged to atmosphere.

A boiler feed water pump 148 pumps water to the heat recovery steam generator 144 to raise steam. The steam and water mixture flows to a steam drum 149, which is part of the heat recovery steam generator 144, to allow the steam to separate from the mixture and flow to a steam turbine auxiliary drive 25*f*. This steam turbine 25*f* converts the steam energy into mechanical work by turning the turbine wheel and driving the auxiliary speed changing drive section 26*f* and the generator 22*f* through overrunning clutches 68*f* and 69*f*.

After giving up a portion of its energy to the steam turbine 25*f*, the steam flows to an air cooled condenser 152 where it is condensed back into water. The steam condensate then flows through a vacuum deaerator 154 for oxygen removal before flowing to the boiler feed water pump 148 which pumps the feed water back to the heat recovery steam generator 144 to generate more steam.

The addition of the heat recovery system to the engine auxiliary drive increases the overall thermal efficiency of the engine auxiliary drive. Several types of steam drivers can be used to drive the generator. An example of an alternate type of steam drive would be a rotary screw steam drive machine.

K. A Seventh Embodiment of the Invention

A seventh embodiment of the present invention will now be described with reference to FIG. 9. Components of this seventh embodiment which are the same as, or similar to, components of earlier embodiments will be given like numerical designations, with a "g" suffix distinguishing those of this seventh embodiment.

This seventh embodiment comprises a solar thermal energy system which combines the benefits of wind power with solar power using the same turbine structure.

In this embodiment, the entire solar thermal energy system is separated from the wind turbine power generation system. The solar thermal system uses an organic rankine cycle heat recovery system to convert solar energy into electricity. FIG. 9 shows the process flow for the solar thermal system. The system components can be located in the support tower or the nacelle substructure of the ninth embodiment.

Figure 9:
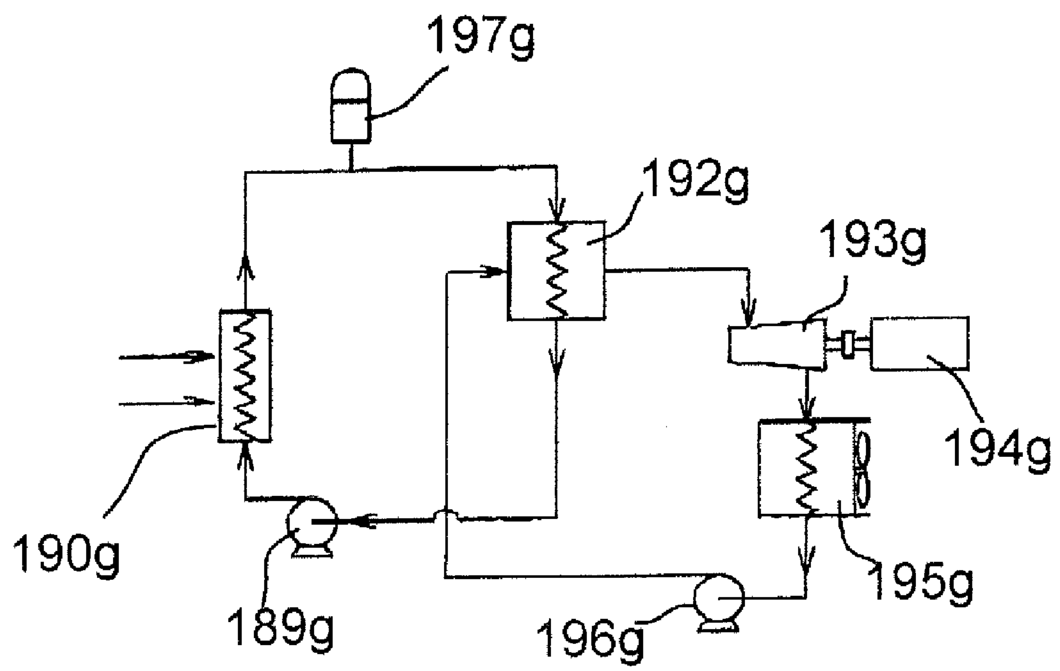
FIG. 9 shows a system for a solar thermal energy system which is independent of the wind turbine power generation system but occupies the same wind turbine structure.

As shown in FIG. 9 there is a solar energy input to a solar absorber 190*g* which provides heat to a high temperature heat transfer fluid which is pumped through the absorber 190*g* using circulating pump 189*g*. The heat transfer fluid then passes through a heat exchanger 192*g* where it vaporizes the organic rankine cycle working fluid. The cooled heat transfer fluid then flows back to the circulation pump 189*g* where it is pumped back to the solar absorber 190*g*. The vaporized organic fluid flows out of the heat exchanger 192*g* and into the expander turbine 193*g*. The expander turbine 193*g* is coupled to a generator 194*g* which produces electric power. The vaporized working fluid, usually propane or butane, passes through the expander turbine to a condenser 195*g* where it is condensed back to a liquid. The liquid then flows to a pump 196*g* which pumps the working fluid back to the exchanger 192*g* for conversion back into a vapor. An expansion tank 197*g* is provided to allow for the expansion of the heat transfer fluid in the solar thermal system.

In addition to the cost savings of combining the wind and solar energy systems in one structure, the solar addition to the wind turbine has the added benefit of providing additional power output during the daylight hours when it is needed most.

L. An Eighth Embodiment of the Invention

An eighth embodiment of the present invention will now be described with reference to FIG. 10. Components of this eighth embodiment which are the same as, or similar to, components of earlier embodiments will be given like numerical designations, with an "h" suffix distinguishing those of this eighth embodiment.

This eighth embodiment comprises a solar thermal energy system and an engine system with heat recovery which combines the benefits of wind power, solar power, and engine power using the same wind turbine support structure.

Figure 10:
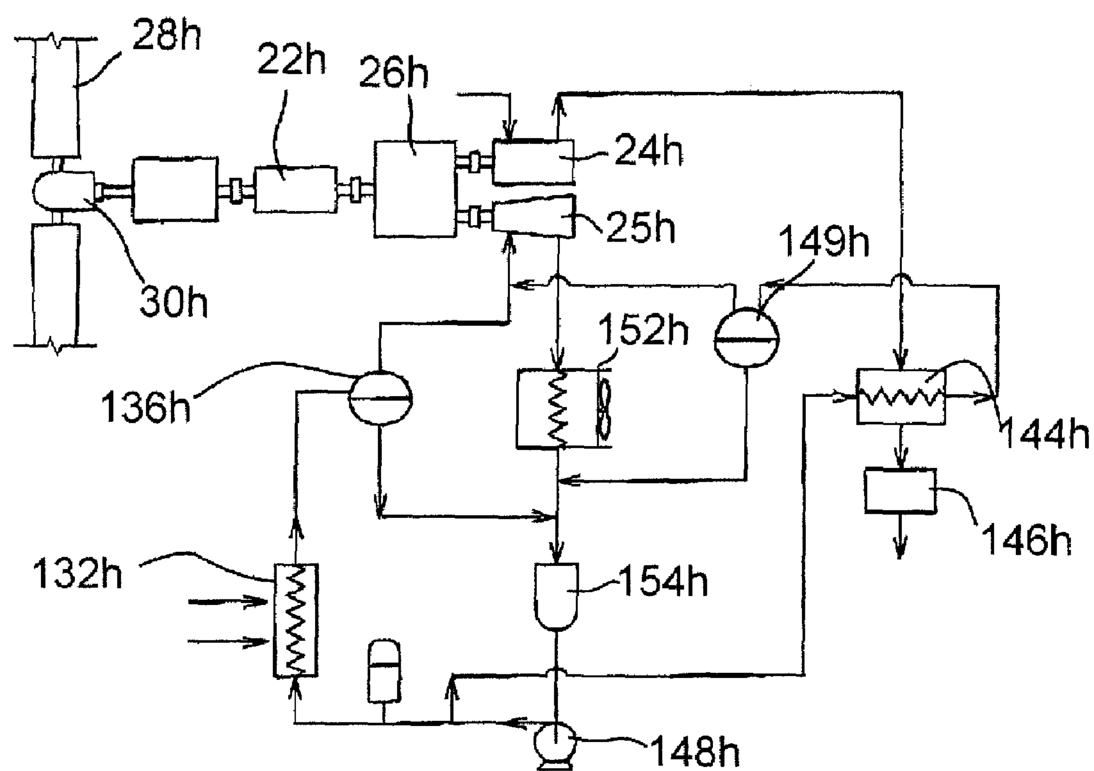
FIG. 10 is a combination of FIGS. 7 and 8 in that it shows a basic wind turbine energy system which utilizes an engine auxiliary drive with heat recovery, an associated steam turbine auxiliary drive, and a solar thermal energy system which uses the same steam turbine.

FIG. 10 shows the process flow for the combined solar thermal system and engine system with heat recovery. In the engine plus heat recovery system, hot engine exhaust leaving the engine 24*h* flows to a heat recovery steam generator 144*h* where the heat in the exhaust generates steam. The cooled exhaust then flows to the emission control unit 146*h* for treatment before it is discharged to the atmosphere. A boiler feed water pump 148*h* pumps water to the heat recovery steam generator 144*h* to raise steam. The steam and water mixture flows to a steam drum 149*h*, which is part of the heat recovery steam generator 144*h*, to allow the steam to separate from the mixture and flow to the steam turbine auxiliary drive 25*h*. The steam turbine 25*h* converts the steam energy into mechanical work by turning the turbine wheel and driving the gear 26*h* and generator 22*h* through overrunning clutches. After giving up a portion of its energy to the steam turbine 25*h*, the steam flows to an air cooled condenser 152*h* where it is condensed back into water. The steam condensate then flows through a vacuum deaerator 154*h* for oxygen removal before flowing to the boiler feed water pump 148*h* which pumps the feed water back to the heat recovery steam generator 144*h* to generate more steam.

In the solar thermal system, the solar energy input to a solar absorber 132*h* is converted into steam which drives a steam turbine 25*h* which is coupled to the wind turbine main generator 22*h*. The steam then exits the steam turbine 25*h* and flows to an air cooled condenser 152*h* where the steam is condensed back into water. The water then flows through a vacuum deaerator 154*h* to remove oxygen and then to the feed water circulating pump 148*h* where it is pumped back to the solar absorber to generate more steam.

M. A Ninth Embodiment of the Invention

Figure 11:
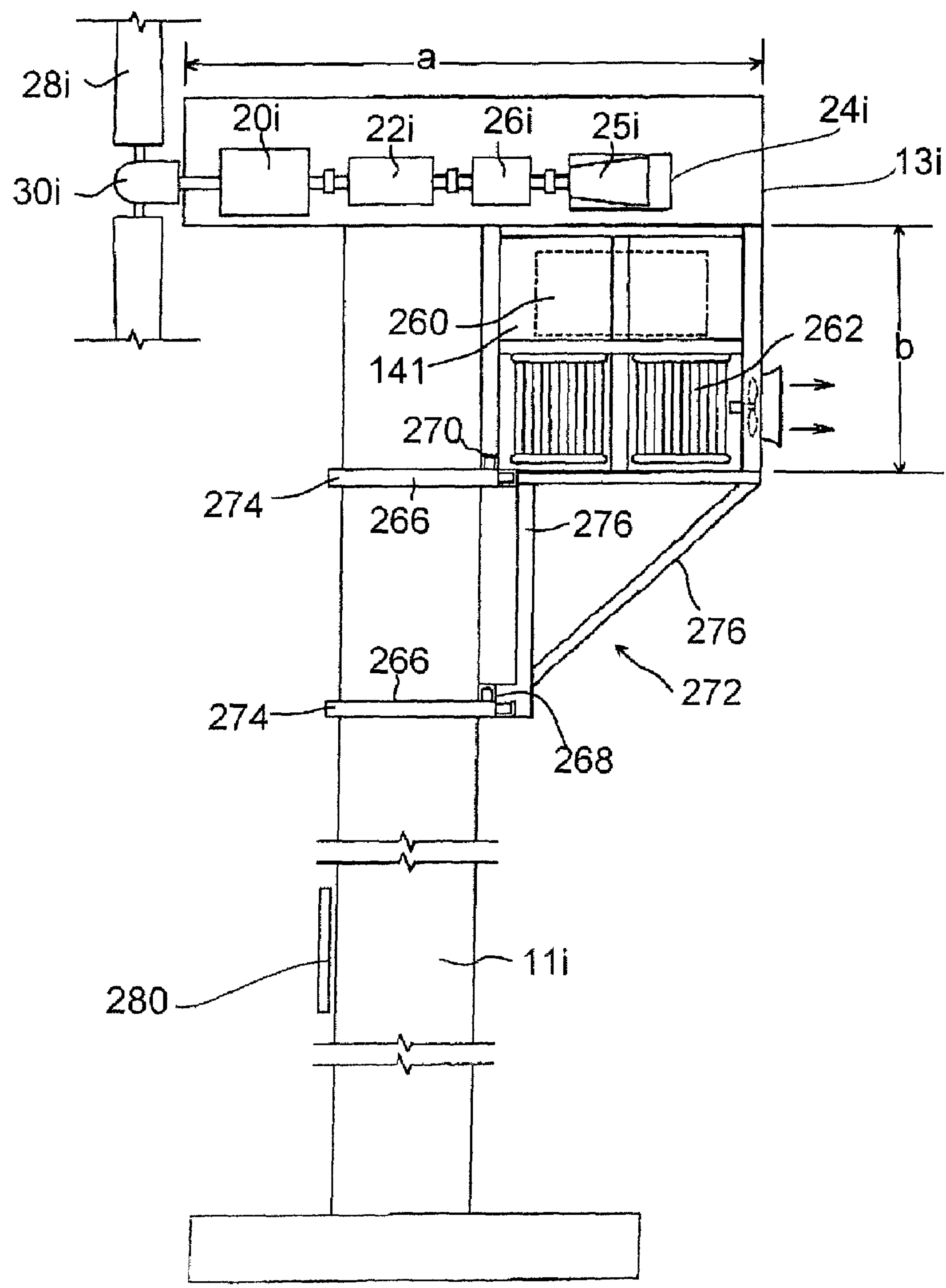
FIG. 11 shows a basic wind turbine system with the addition of the nacelle substructure for housing additional heat recovery and power generation equipment.

This ninth embodiment of the present invention will now be described with reference to FIG. 11. Some of the components in this ninth embodiment which are substantially the same as, or similar to, corresponding components of earlier embodiments will be given like numerical designations, with an "i" distinguishing those of this ninth embodiment. Accordingly, there are the propeller blades 28*i* along with the hub 30*i*. There is also the speed changing power section 20*i*, the generator 22*i*, and auxiliary speed changing section 26*i*, an auxiliary drive section 24*i*, and a second auxiliary drive power 25*i*, which in this instance is in the form of a steam driven turbine.

This ninth embodiment differs from the earlier embodiments in that the support structure (i.e., the nacelle 13*i*) has a nacelle substructure 14*i* to provide additional working areas for various purposes, such as to house heat recovery equipment associated with, for example, an auxiliary steam turbine drive.

The existing technology utilizes space in the wind turbine support tower and nacelle to house all equipment necessary to operate a wind turbine. At times it can be a challenge to install all equipment in the allowable space in a cost efficient manner and there is very little room for any extra equipment. Because the nacelle rotates to keep the wind turbine blades facing the wind, any equipment located in the support tower which must cooperate with equipment in the nacelle must address the problem of rotation. This means the design must incorporate flexible joints, cables, hoses and other interconnections that allow the necessary rotation. By installing a nacelle substructure below the nacelle and on the downwind side of the support tower, it is possible to provide a large amount of space to mount equipment which rotates with the nacelle. Thus, the problem of interfacing equipment that does not rotate with equipment that does rotate is eliminated.

Another advantage of nacelle substructures is that it can be shop fabricated and lifted by crane to attach to the underside of the nacelle. Because the nacelle substructure is designed with a width that is no wider than the support tower, there are no detrimental effects to efficient air flow across the tower which would have a negative impact on the wind turbine output. To the contrary, the shape of the nacelle substructure enclosure will act like a tail behind the tower to assist in yaw control.

This ninth embodiment can be advantageous to any of the options described in earlier embodiments, including a standard wind turbine without any of these options. The substructure could be used with a standard wind turbine to house the electrical gear or other equipment located in the tower to achieve a cost savings during manufacturing. Due to the extremely tall support towers, it is possible to design the height of the substructure such that it extends down the tower as required to house all equipment intended to be located in the tower.

Although an auxiliary engine drive 24*i* and steam turbine drive 25*i* are shown coupled to the auxiliary gear 26*i*, various other configurations shown in other options are equally suited to cooperate with the nacelle substructure. For example, in FIG. 11, there is shown in the upper part of the substructure a heat recovery steam generator or organic rankine cycle heat recovery equipment, generally designated 260. Then below this there are air cooled condensers indicated at 262. Below the nacelle substructure 141 there is a support structure 272 which provides support for the substructure, and which could also provide support for at least part of the nacelle 13*i* itself. This support structure 272 comprises a pair of circumferential rings 274 which are connected to the tower 111, and there are roller bearings 268 which are rotatably mounted for circular movement on the rings 274 around the tower 111. Then the support structure 272 of the substructure, such as indicated at 276, is supported by these bearing rings.

The nacelle substructure has the same width as the tower. Thus, the substructure can be extended further down the tower to accommodate additional equipment. There are various options which include the following:

i) an engine only configuration in the nacelle;
ii) /HRSG/Steam Turbine/Air Cooled Condenser;
iii) engine/orc heat recovery/ajr cooled condenser;
iv) solar steam generator/steam turbine/air cooled condenser;
v) engine/HRSG/solar steam generator/steam turbine/ajr cooled condenser;
vi) solar thermal heat absorber (heat transfer fluid)/orc heat recovery/air cooled condenser;
vii) engine/solar thermal heat absorber (heat transfer fluid)/orc heat recovery/air cooler.

The nacelle substructure 141 is attached to the underside of the nacelle such that it rotates with the nacelle. Various pieces of equipment 260 can be located within the substructure on various levels. Examples are heat recovery equipment 260, air cooled condensers 262 and cooling fans 264. As indicated above, the structural supports 272 for the nacelle substructure are supported by the tower using metal support rings 266 that enable the nacelle to roll around the support rings 266 when the nacelle rotates to face the wind. Solar thermal absorbers 280 are located on the support tower itself.

Obviously, the vertical dimension of the nacelle substructure could vary substantially. In the representation of the sub-nacelle in FIG. 1, its depth dimension (indicated at "b" in FIG. 11), is about 40% of the horizontal length dimension (indicated at "a" in FIG. 11), extending from the forward working end of the nacelle to the rear working end. Obviously, this vertical dimension "b" could be increased or decreased substantially, depending upon various factors. For example, this 40% dimension could be decreased down to about 30%, 20%, 15%, or 10%, or even as low as about 5%. Also, it could be greatly increased to values of, for example, 50%, 75%, 100%, 150%, 200% A, 250%, 300%, 400%, 500%, or even possibly higher.

The nacelle substructure is an elegantly simple method of providing large amounts of space for equipment which rotates along with the nacelle and thereby eliminating the problem of interfacing rotating and non-rotating equipment. The additional weight will also be a counterweight to the wind turbine blades and will allow them to be located further from the tower, thus, reducing the blade flex when the blades pass by the tower.

To summarize at least some of the features of the present invention, the embodiments of the present invention provide the following advantages:

i) The auxiliary drive system will allow a wind turbine to generate firm power rather than non-firm energy.

ii) The hybrid wind turbine which incorporates the solar thermal heat recovery system into the wind turbine allows the same generator, switchgear, support tower, real estate, and transmission lines to be used by both the wind turbine and solar thermal power generator.

iii) The nacelle sub-structure provides additional space to install equipment that must move with the equipment in the nacelle such as heat recovery steam generators, air coolers, organic rankine cycle heat recovery systems and electrical gear.

iv) The nacelle sub-structure enclosure will act as a tail fin on the wind turbine to assist with yaw control.

v) The nacelle sub-structure module can be constructed in a shop with ideal working conditions thus improving worker productivity and reducing construction costs.

vi) The equipment located in the nacelle sub-structure can be installed in an upright position and remain in an upright position throughout the construction process. Equipment located in the support tower must be turned on its side at some point during the shop fabrication, shipment, or construction process.

vii) The energy conversion efficiency in BTU/KWH of the hybrid wind turbine which uses wind, and/or solar and/or thermal energy inputs in one combined system is very efficient when compared with the heat rate in BTU/KWH of a thermal energy conversion system alone due to the non-thermal energy inputs from the wind and solar systems.

viii) All components of the hybrid wind turbine can be procured and constructed using commercially available equipment and commercially available engineering and construction practices.

ix) The nacelle sub-structure provides an alternate escape route for operations personnel in the event of a fire in the nacelle.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. A wind turbine assembly capable of providing a total firm power output, said assembly comprising;

a) a combined wind turbine support structure having an upper portion and comprising a tower and a power generating support structure that is rotatably mounted to the tower at the upper portion of the combined wind turbine support structure;

b) a generator section positioned in or at the power generating support structure;

c) a wind power section mounted to the power generating support structure and comprising at least a rotary mounted blade section to provide a non-firm wind power output;

d) an auxiliary power section which is to provide an auxiliary firm power output for said generator section, where the generator section and the auxiliary power section are housed within the upper portion of the combined wind turbine support structure;

e) said assembly being provided with power and/or other energy transfer connections to accomplish rotary power, transfer and/or other energy transfer between one or more of said generator section, wind power section, and said auxiliary power section;

f) said wind turbine assembly and being arranged to be able to provide firm power at a desired power level to the generator section by operating in at least three different modes of operation, namely;

i. an only wind power mode for a situation where there is sufficient wind velocity so that the blade section alone is able to generate sufficient non-firm power, and the auxiliary power section can remain dormant;

ii. an only auxiliary power mode where the wind velocity is sufficiently low so that it is not able to drive the blade section, or at least so slowly as to be little value, and the auxiliary power section can be activated to deliver sufficient firm power to the generator section to maintain the power output that is needed; and iii. a combined wind power/auxiliary power mode where the velocity of the wind is such that the rotation of the blade section is able to provide only enough power to meet only partially the level of power needed, and the auxiliary power section is operated at a level to deliver to the generator section sufficient power to meet the level of power needed.

2. The assembly as recited in claim 1, wherein there is a primary drive section comprising said wind power section and a power transfer section to transmit rotary power from the wind power section to the generator section.

3. The assembly as recited in claim 1, wherein said primary drive section comprises a speed changing drive section to increase the rotational speed transmitted to the generator section.

4. The assembly as recited in claim 2, wherein said generator section comprises a generator having first and second generator drive input connections, with the first generator drive input connection having a first operative connection to the primary drive section and the second generator drive input connection has a second operative connection to the auxiliary power section.

5. The assembly as recited in claim 4, wherein there is a first overrunning drive connection between said primary power section and the generator drive input section and there is a second overrunning drive connection which is located between the generator section and the auxiliary drive section whereby said generator is able to be driven from the auxiliary power section without being in a drive mode with said primary drive section, and the generator could be driven by the auxiliary power section while not being in a drive mode with the primary drive section.

6. The assembly as recited in claim 1, wherein said auxiliary power section comprises a torque converter to provide a variable speed power input to said generator section.

7. The assembly as recited in claim 2, wherein said primary drive connection also receives a power input from at least one power source from said auxiliary power section to transmit power from said at least one auxiliary power source to said generator section.

8. The assembly as recited in claim 2, wherein said auxiliary power section comprises one or more of an internal combustion engine, an external combustion engine, a steam turbine, a steam engine, a hybrid drive, a gasoline engine, a diesel engine, a natural gas engine, a gas turbine engine, a sterling engine, a gas expander, a hydraulic motor, and an electric motor, and a power source for the auxiliary power section could be one or more of hydraulic energy, gasoline, diesel fuel, jet fuel, heavy oil, natural gas, propane, hydrogen, ethanol, coal, wood, and any other energy source suitable for the auxiliary power section.

9. The assembly as recited in claim 1, wherein said auxiliary power section comprises a fuel burning engine having an engine exhaust and a liquid engine coolant which are directed to heat recovery sections to extract waste energy and convert the waste energy to useful power.

10. The assembly as recited in claim 9, wherein the heat recovery from the exhaust and the engine coolant is accomplished in rankine cycle sections with cooled exhaust being discharged and the coolant being returned to the engine.

11. The assembly as recited as claim 1, further comprising a steam generating section located in or adjacent to said tower and a steam turbine comprising at least in part the auxiliary power section, with the steam directed to the steam turbine to provide a rotating power output to said generator section.

12. The assembly as recited in claim 1, comprising a solar absorbent section, a pump and conduit section being arranged to direct a liquid medium through the solar absorbent section to heat the liquid medium to provide a gaseous medium portion, and a liquid medium portion, and direct the liquid medium portion back to the solar absorber to absorb further solar heat and continue to provide the liquid form of the liquid and gaseous form of the liquid medium, said assembly further comprising a gaseous liquid turbine to function as at least a part of a non-firm auxiliary power section, whereby there are three sources of power to drive the generator, namely;

i. wind;

ii. solar generated power; and iii. a portion of the auxiliary drive section which would be fueled by a firm source of energy.

13. The assembly as recited in claim 12, wherein said liquid medium passing through the solar absorbent section comprises water.

14. The assembly as recited in claim 1, wherein said power generating support structure has a vertical axis of rotation, a front to rear front support structure portion located between the vertical axis of rotation and the location of the blade section of the assembly and a rear support structure portion which is positioned between the vertical axis of rotation and an end portion of the support structure that is located, with respect to the axis of rotation, at a location diametrically opposite from the forward end section, said assembly comprising a substructure which is located beneath the rear support structure portion so as to be vertically aligned with said rear support structure portion and connected to said support structure so as to remain positioned below the rear support structure portion as the support structure rotates to various orientations so that the blade section is facing the wind, said substructure having a containing region where various equipment can be stored.

15. The assembly as recited in claim 14, wherein said substructure has sidewall portions relative to a front to rear alignment axis, with said sidewalls having a sidewall location which is no wider than a width location of the tower so as to remain shielded from the air stream flowing rearwardly and around the tower.

16. The assembly as recited in claim 14, wherein said substructure has a vertical dimension of the containing region which is at least as great as about twenty percent of a horizontal length dimension of a containing working region of the substructure.

17. The assembly as recited in claim 14, wherein said substructure is supported at least in part by a support structure which is mounted to the tower so as to be able to rotate around the tower with the power generating support structure.

18. A method of providing and operating a wind turbine assembly to provide a firm power output, said assembly comprising;

a) providing a combined wind turbine support structure comprising a tower and a power generating support structure that is rotatably mounted to the tower about a substantially vertical axis at an upper portion of the combined wind turbine support structure;

b) positioning a generator section within the power generating support structure so the generator rotates therewith the power generating support structure about the substantially vertical axis;

c) mounting a wind power section with a blade section to the power generating support structure and positioning these in a wind location to provide a non-firm wind power output to the generator section;

d) operating an auxiliary power section to provide an auxiliary firm power output for said generator section and having the auxiliary power section attached to the upper portion of the combined wind turbine support structure;

e) continuing to operate said wind turbine assembly in selected modes to provide firm power at a desired power level to the generator in at least three different modes of operation, namely;

i. an only wind power mode for a situation where there is sufficient wind velocity so that the blade section alone is able to generate sufficient non-firm power, and the auxiliary power section can remain dormant;

ii. an only auxiliary power mode where the wind velocity is sufficiently low so that it is not able to drive the blade section, or at least so slowly as to be little value, and the auxiliary power section can be activated to deliver sufficient firm power to the generator section to maintain the power output that is needed; and iii. a combined wind power/auxiliary power mode where the velocity of the wind is such that the rotation of the blade section is able to provide only enough power to meet only partially the level of power needed, and the auxiliary power section is operated at a level to deliver to the generator section sufficient power to meet the level of power needed.

19. The method as recited in claim 18, further comprising providing a solar absorbent section and directing a liquid mediums through the solar absorbent section to heat the liquid medium to provide a liquid medium portion and a gaseous liquid medium portion and directing the gaseous medium to drive a power turbine to provide power to the generator, and to also provide a firm power source to said generator section so that there are three sources of power to drive the generator, namely;

i. wind;

ii. solar generated power; and iii. a portion of the auxiliary drive section which would be fueled by a firm source of energy.

20. The method as recited in clam 18, further comprising providing a steam generating section and directing steam to an auxiliary power section to drive a steam turbine to provide power for the generator.

21. The assembly as recited in claim 1, comprising a solar absorbent section and a pump and conduit section being arranged to direct a liquid medium through the solar absorbent section to heat a liquid medium to provide a liquid source of thermal energy for heat transfer to an organic rankine cycle energy conversion system where the liquid medium is recycled back to the solar absorber to absorb further heat, said assembly designed to function as at least a part of a non-firm auxiliary power section, whereby there are three sources of power to drive the generator, namely;

i. wind;

ii. solar generated power; and iii. a portion of the auxiliary drive section which would be fueled by a firm source of energy.

22. The assembly as recited in claim 21, wherein said liquid medium passing through the solar absorbent section comprises water or a synthetic or oil based heat transfer fluid.

23. The method as recited in claim 20, further comprising a solar absorbent section and a pump and conduit section directing a liquid medium through the solar absorbent section to heat a liquid medium to provide a source of thermal energy for heat transfer to an organic rankine cycle energy conversion system where the liquid medium is recycled back to the solar absorber to absorb further heat to drive a power turbine to provide power to the generator, and to also provide a firm power source to said generator section so that there are three sources of power to drive the generator, namely;

i. wind;

ii. solar generated power; and iii. a portion of the auxiliary drive section which would be fueled by a firm source of energy.

24. The method as recited in claim 23, further comprising an organic rankine cycle boiler section and directing vaporized process fluid to an auxiliary power section to drive a gaseous turbine to provide power for the generator.

* * * * *